US008891248B2

(12) United States Patent
Chu et al.

(10) Patent No.: US 8,891,248 B2
(45) Date of Patent: Nov. 18, 2014

(54) ANGLE-ADJUSTABLE SUPPORT WITH PIVOT MECHANISM

(75) Inventors: Yu-Chen Chu, Taichung (TW); Chang-Cheng Lin, Taichung (TW); Kuo-Kuang Liu, Nantou County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 347 days.

(21) Appl. No.: 13/454,431

(22) Filed: Apr. 24, 2012

(65) Prior Publication Data

US 2013/0056603 A1 Mar. 7, 2013

(30) Foreign Application Priority Data

Sep. 6, 2011 (TW) ............................ 100132020 A

(51) Int. Cl.
*H05K 7/02* (2006.01)
*F16M 11/10* (2006.01)

(52) U.S. Cl.
CPC ......... *F16M 11/10* (2013.01); *F16M 2200/024* (2013.01); *Y10S 248/922* (2013.01)
USPC ................. 361/807; 361/679.27; 361/679.12; 361/679.55; 361/679.58; 361/679.06; 248/397; 248/393; 248/372.1; 248/122.1; 248/922

(58) Field of Classification Search
CPC ............ Y10S 248/919; Y10S 248/917; Y10S 248/92; Y10S 345/905; F16M 11/10; F16M 11/2021; G06F 1/1679; G06F 1/1616; G06F 1/1667
USPC .................... 361/807, 801, 802, 725, 679.55, 361/679.58, 679.6, 679.43, 679.27, 679.2, 361/679.12, 679.06, 679.02; 248/397, 393, 248/372.1, 122.1, 922, 923
See application file for complete search history.

(56) References Cited

U.S. PATENT DOCUMENTS 6,354,552 B1 * 3/2002 Chiu ............................ 248/422

FOREIGN PATENT DOCUMENTS

CN 2615419 5/2004

OTHER PUBLICATIONS

USPTO, "Office Action", Jun. 6, 2014.

* cited by examiner

*Primary Examiner* — Robert J Hoffberg
*Assistant Examiner* — Hung Dang
(74) *Attorney, Agent, or Firm* — WPAT, PC; Justin King

(57) ABSTRACT

An angle-adjustable support includes a base, a carrier and a pivot mechanism. The base includes a sidewall and a bottom. The sidewall has a first pivot and a second pivot. The pivot mechanism pivotally connects the carrier with the base. The pivot mechanism has three working states. The carrier is locked when the pivot mechanism works in a first working state. The carrier is capable of pivoting relative to the base in a clockwise or anticlockwise when the pivot mechanism works in a second working state. The carrier is free to rotate when the pivot mechanism works in a third working state.

10 Claims, 5 Drawing Sheets

400
200
300
310
320
100

ANGLE-ADJUSTABLE SUPPORT WITH PIVOT MECHANISM

TECHNICAL FIELD

The present invention relates to support, and more particularly to a support with a pivot mechanism such that an angle of the support is adjustable.

BACKGROUND

In daily life, pivot mechanisms are widely applied to such articles as doors, windows, rearview mirrors of cars, notebook computers, electronic dictionaries, personal digital assistants (PDAs) and mobile phones. Such an article generally includes a rotating body and a body. The rotating body is rotatable relative to the body through a pivot mechanism. The pivot mechanism generally includes a shaft, a gasket, a stator and a rotor. The rotating body of the article is connected to the rotor such that the rotating body can rotate together with the rotor. As the rotor rotates relative to the stator, the friction force produced between the stator and the rotor is used to counteract the torque force produced by the weight of the rotating body, so that the rotating body can be positioned and held in place by the external force. However, the friction force between the stator and the rotor may too large or too small. If the friction force between the stator and the rotor is too large, the necessary of external force taken to rotate the rotating body also become larger. In the meantime, the pivot mechanism is easily worn out and has a shot service life. In the contrary, if the friction force between the stator and the rotor is too small, the pivot mechanism is loose and the rotating body cannot be efficiently positioned and held in place.

In addition, if the relationship between the components of the pivot mechanism is improper, a counter force is produced between the stator and the rotor during rotating. The counter force drives the rotating body to rotate back when an external force used to rotate the rotating body is removed. Thus, the rotating body cannot be exactly positioned.

Thus, there is a room for improving the pivot mechanism.

SUMMARY

The present invention provides an angle-adjustable support which includes a base, a carrier and a pivot mechanism. The base includes a sidewall and a bottom. The sidewall has a first pivot and a second pivot. The pivot mechanism is arranged between the carrier and the base. The pivot mechanism has three kind of working states. In a first working state, the carrier is locked. In a second working state, the carrier is capable of pivoting relative to the base in a clockwise or anticlockwise. In a third working state, the carrier is free to rotate.

The pivot mechanism further includes a rotator, a stopper and an adjuster. The rotator is pivotally connected to the first pivot. The carrier is attached to and pivotable together with the rotator. A plurality of teeth are formed at a circumferential edge of the rotator. The stopper is pivotally connected to the second pivot. The stopper includes an engaging portion and a bump. The engaging portion is suitable to be engaged with the teeth. The adjuster is pivotally connected to the first pivot. The adjuster defines a recession suitable to receive the bump of the stopper. When the adjuster is positioned in an original position, the engaging portion is engaged with one of the teeth and the bump is locked in the recession; when the adjuster is rotated for a first angle from the original position, the bump is moved out from the recession and the engaging portion is contacted with one of the teeth; when the adjuster is rotated for a second angle from the original position, the bump is moved out from the recession and the engaging portion is disengaged from the teeth.

In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the instant disclosure.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

An angle-adjustable support in accordance with the instant disclosure utilizes a base, a carrier and a pivot mechanism to achieve unlimited angular adjustment and capable of fixing the device disposed on the carrier at a desired angular position. The user can easily adjust the viewing angle of the device and perform other similar operations.

Figure 1:
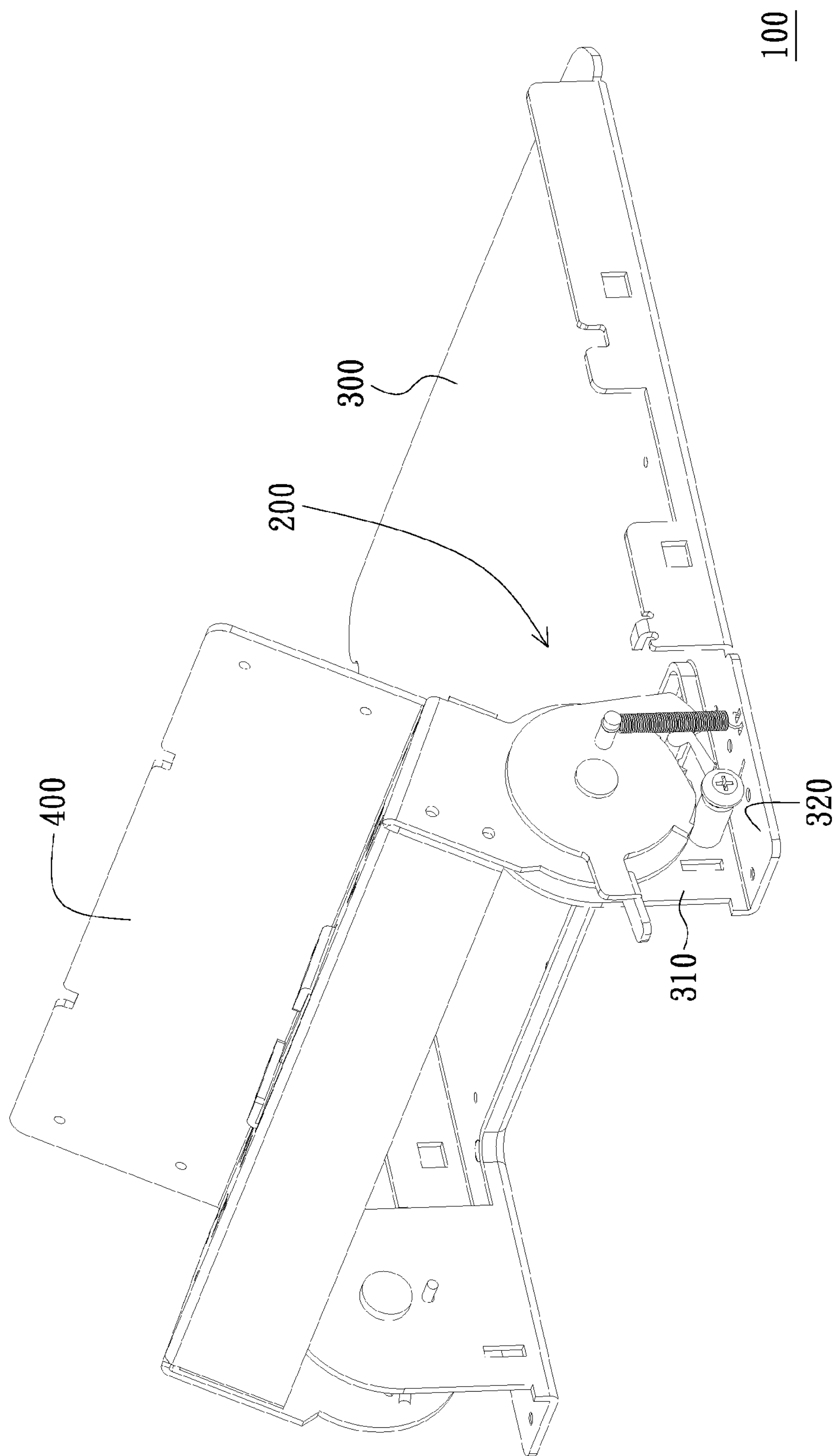
FIG. 1 is a schematic view of an angle-adjustable support of the present invention.
Figure 2:
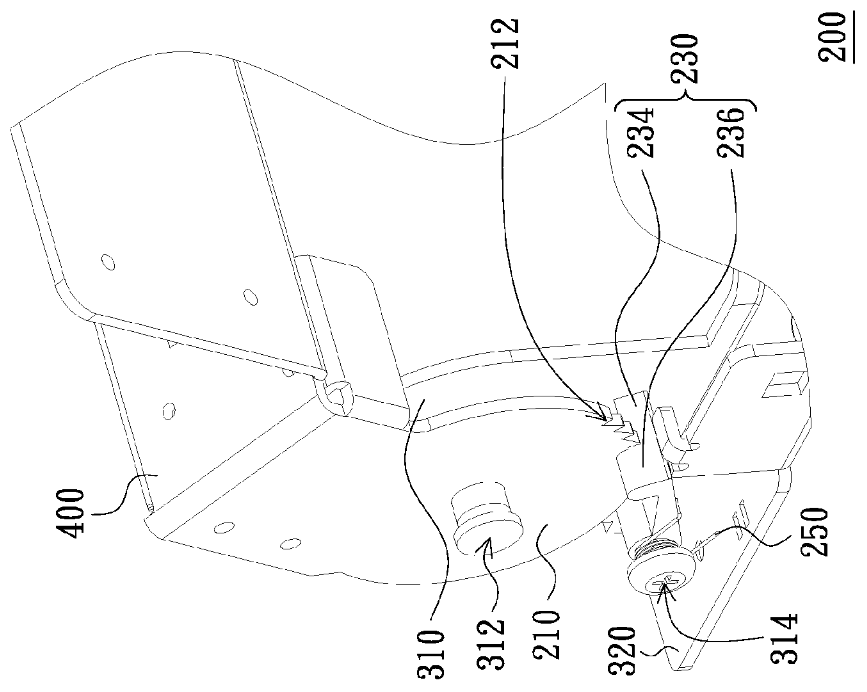
FIG. 2 is a partially schematic view showing an adjuster disassembled from the other elements of the support of the present invention.
Figure 2:
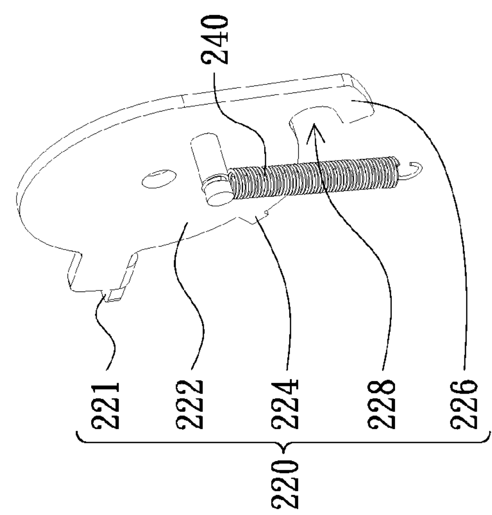

Please refer to FIG. 1 shows an angle-adjustable support 100 according to an exemplary embodiment of the present invention. The support 100 includes a pivot mechanism 200, a base 300 and a carrier 400. The base 300 includes a sidewall 310 and a bottom 320. Referring also to FIG. 2, the sidewall 310 has a first pivot 312 and a second pivot 314 protruded therefrom. The pivot mechanism 200 is configured for pivotally connecting the base 300 and the carrier 400 such that the carrier 400 is pivotable relative to the base 300. The pivot mechanism 200 has three kind of working states. When the pivot mechanism 200 works in a first working state, the carrier 400 is locked and cannot pivot relative to the base 300. When the pivot mechanism 200 works in a second working state, the carrier 400 can pivot relative to the base 300 only in clockwise or anticlockwise. When the pivot mechanism 200 works in a third working state, the carrier 400 is free to rotate. The carrier 400 may, without limitation, be configured for carrying the device. For example, the carrier 400 of the support 100 can be used to support the device thereon such as a display of a notebook or computer so that the display can pivot relative to the base 300 through the pivot mechanism 200. The support 100 also may be applied to reading stands for supporting books, or be applied to holders for carrying other things.

Please refer to FIGS. 1 and 2, the pivot mechanism 200 includes a rotator 210, an adjuster 220 and a stopper 230. The rotator 210 is pivotally connected to the first pivot 312 of the sidewall 310 of the base 300. A plurality of teeth 212 are formed at portion of circumferential edge of the rotator 210. The teeth 212 may be ratchets. Due to the rotator 210 is fixedly connected with the carrier 400, when the rotator 210 rotates around the first pivot 312, the carrier 400 is rotated together with the rotator 210 relative to the base 300. In this embodiment, the rotator 210 may, without limitation, be integrally formed with the carrier 400.

The adjuster 220 is pivotally connected to the first pivot 312 and is rotated relative to the sidewall 310 or the rotator 210. The adjuster 220 includes a body 222, a protrusion 224 and a hook 226. The hook 226 extends from the body 222. A recession 228 is formed between the hook 226 and the body 222. A shifter 221 attached to an external surface of the body 222 for conveniently operating the adjuster 220. When an force is applied to the shifter 221 to rotate the adjuster 220, the adjuster 220 is rotated relative to the first pivot 312. The shifter 221, the protrusion 224 and the hook 226 are formed at a circumferential edge of the body 222, wherein the protrusion 224 is located between the shifter 221 and the hook 226.

The pivot mechanism 200 may further include an elastic element 240. The elastic element 240 connects the adjuster 220 and the bottom 320 of the base 300, for giving a restoring force to the adjuster 220. When there is no external force applied to the adjuster 220, the adjuster 220 is rotated to its original position by the restoring force of the elastic element 240. The elastic element 240 may, without limitation, be a compression spring.

The stopper 230 is pivotally connected to the second pivot 314. The stopper 230 includes an engaging portion 234 and a bump 236 connected with and located beside the engaging portion 234. The bump 236 can be suitably locked in the recession 228 of the adjuster 220. The engaging portion 234 can selectively match with one of the teeth 212 of the rotator 210 to cause the carrier 400 to be positioned with a particular angle relative to the base 300.

In order to describe the present support 100 more clearly, an operating principle of the present support 100 is described accompanying drawings.

Figure 3A:
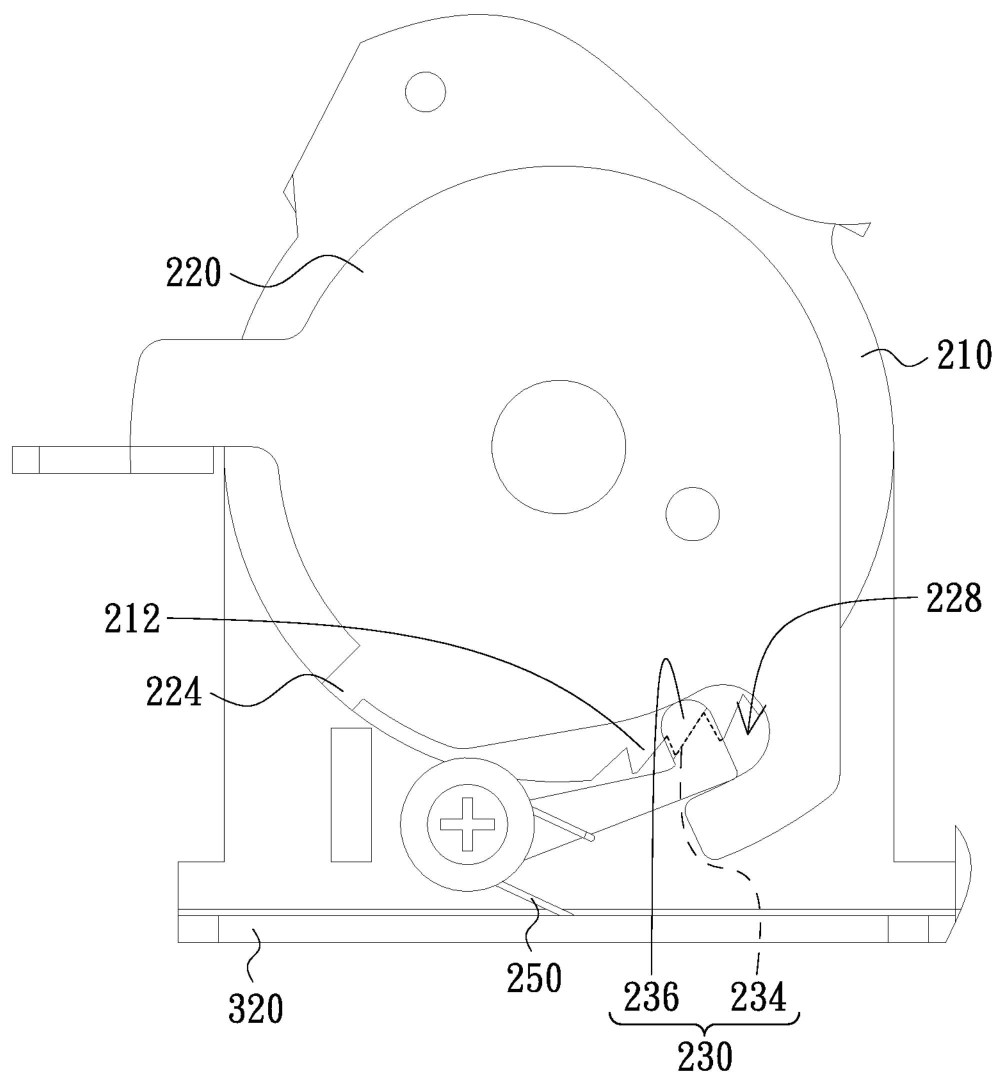
FIG. 3A is a schematic view showing the support of the present invention positioned in a first working state.

Please refer to FIG. 3A, the support 100 positioned in a first working state, wherein the rotator 210 is completely locked. The bump 236 of the stopper 230 is engaged in the recession 228. At the same time, the engaging portion 234 is engaged with one of the teeth 212. Thus, the rotator 210 is locked and cannot rotate in any direction, so that the inclination angle of the carrier 400 can be fixedly retained.

Figure 3B:
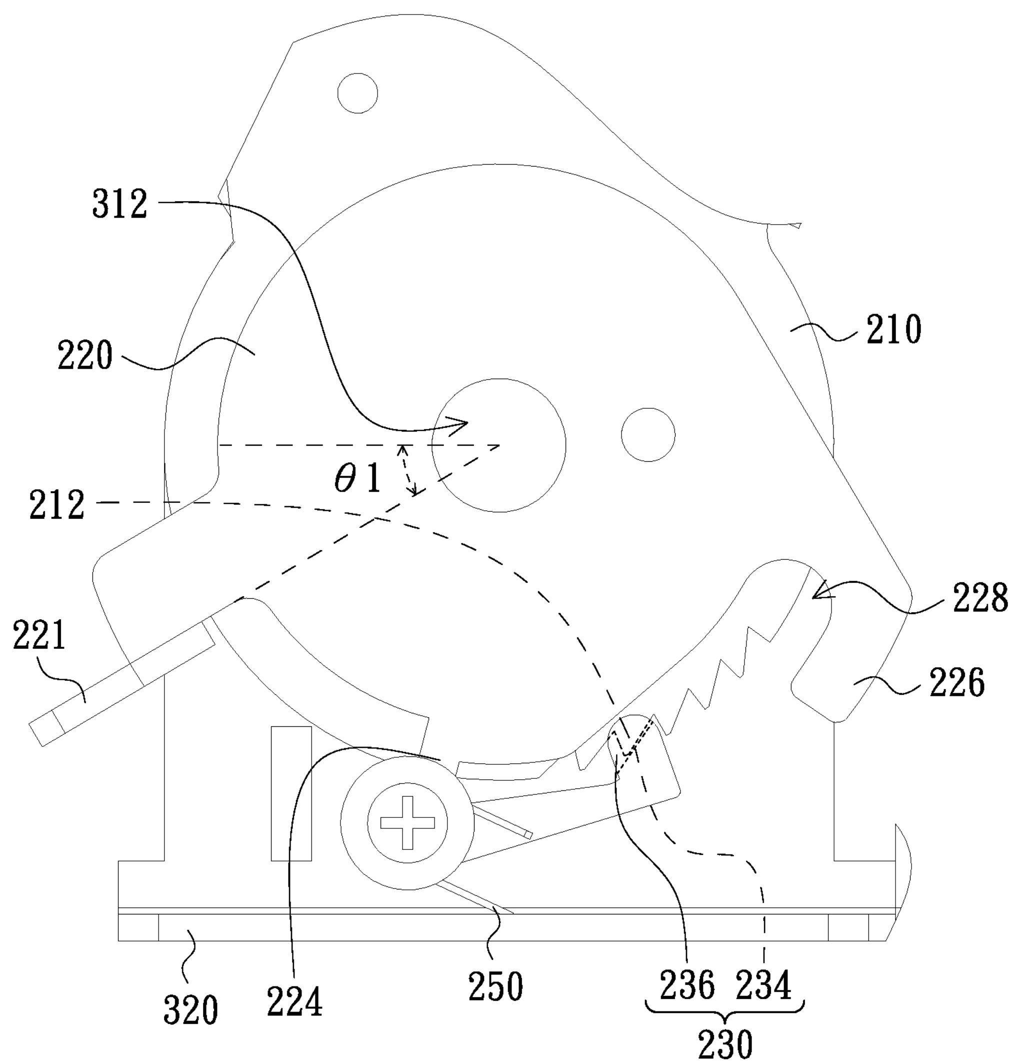
FIG. 3B is a schematic view showing the support of the present invention positioned in a second working state.

Please refer to FIG. 3B, the support 100 positioned in a second working state, wherein the rotator 210 can rotate in clockwise or anticlockwise. In this working state, the shifter 221 is pressed down and the adjuster 220 is rotated for an angle, for example first angle θ1, the bump 236 is moved out from the recession 228 and the engaging portion 234 is contacted with one of the teeth 212. Since the teeth 212 and the engaging portion 234 are shaped like ratchets, the rotator 210 can rotate anticlockwise but cannot rotate clockwise relative to the first pivot 312. The carrier 400 is rotated together with the rotator 210 in anticlockwise so as to adjust the inclination angle of the carrier 400.

Specifically, in the second working state shown in FIG. 3B, when the rotator 210 is rotated anticlockwise, the teeth 212 forcibly slide over the engaging portion 234 one by one and meanwhile exert a downward acting force on the engaging portion 234. The acting force drives the stopper 230 to rotate clockwise around the second pivot 314 for a small angle. In this embodiment, a torsion spring 250 is connected to the second pivot 314, with one end of the torsion spring 250 resisting the stopper 230 and another end thereof resisting the bottom 320 of the base 300. The torsion spring 250 is configured for pushing the stopper 230 to rotate back to its original position. When a tooth 212 presses the engaging portion 234 to cause the stopper 230 to rotate clockwise, the torsion spring 250 is deformed. After the tooth 212 has moved over the engaging portion 234 and before the next tooth 212 contacts the engaging portion 234, the deformed torsion spring 250 provides a restoring force to push the stopper 230 to rotate anticlockwise back to its original position.

Figure 3C:
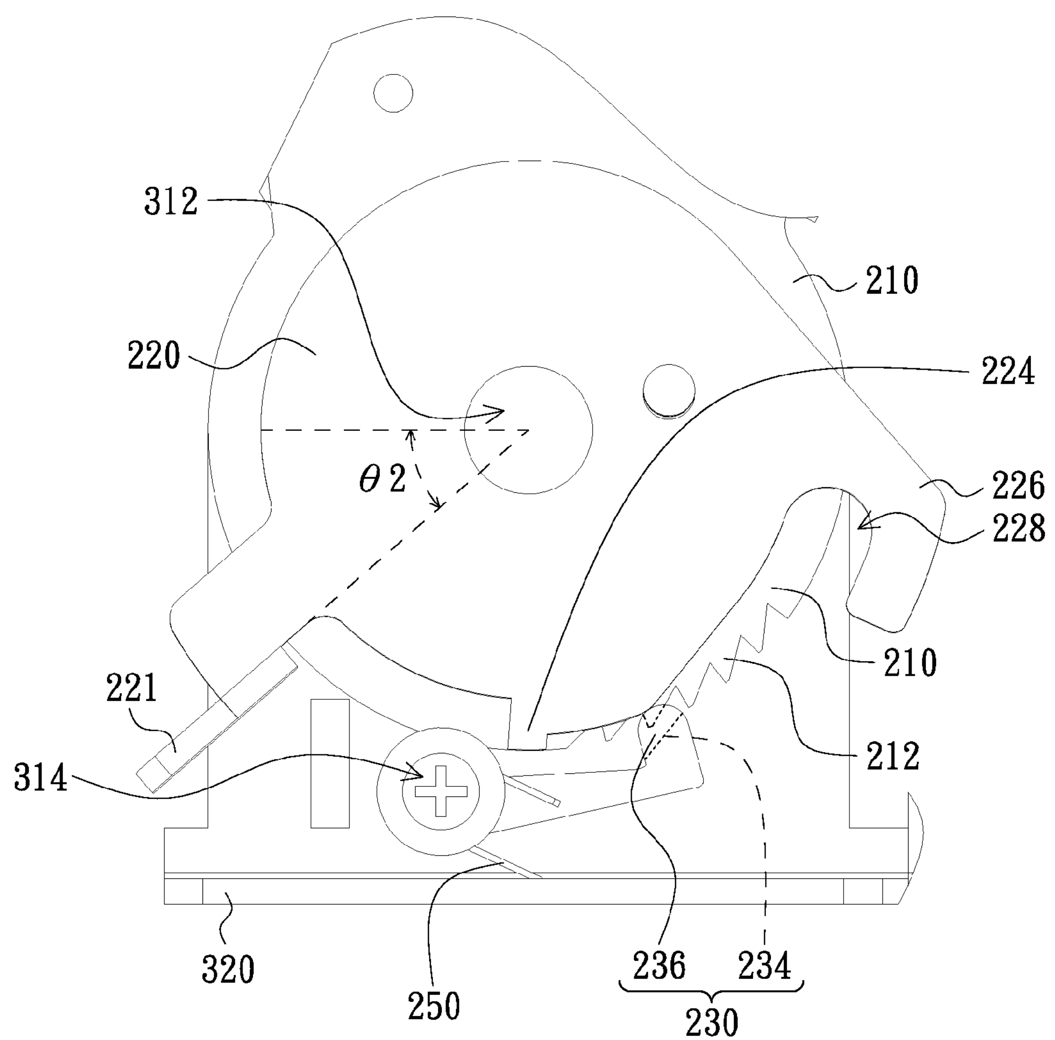
FIG. 3C is a schematic view showing the support of the present invention positioned in a third working state.

Please refer to FIG. 3C, the support 100 positioned in a third working state, wherein the rotator 210 can rotate bidirectionally, i.e., clockwise and anticlockwise. The shifter 221 is pressed down and the adjuster 220 is rotated for an angle, for example second angle θ2, from its original position, the protrusion 224 abuts against the bump 236. The protrusion 224 pushes the bump 236 downwardly to cause the stopper 230 to rotate clockwise relative to the second pivot 314, so as to completely disengage the engaging portion 234 from the teeth 212. At this time, the rotator 210 is free to rotate and allow the carrier 400 at different angles.

When the adjuster 220 pushes the stopper 230 to rotate clockwise relative to the second pivot 314, the stopper 230 brings the torsion spring 250 to be deformed. Then, when the protrusion 224 of the adjuster 220 has been moved away from the bump 236, the deformed torsion spring 250 rebounds to push the stopper 230 back to its original position.

The coverage of the angle in the second working state is defined by circumstance that the bump is not within the recession and the engaging portion is engaged with one of the teeth, and, the coverage of the angle in the third working state is defined by circumstance that the engaging portion did not touched one of the teeth. The aforementioned angle in the third working state is larger than that in the second working state, i.e., the second angle θ2 is larger than the first angle θ1 in the exemplary embodiment of the present invention.

In summary, the support 100 of the illustrated embodiment utilizes the adjuster 220 to change the position of the stopper 230 and uses the engaging portion 234 to match with one of the teeth 212, so as to retain a desired inclination angle for the carrier 400 firmly and that is no concern of the friction force between the stator and the rotor may too large or too small. When the bump 236 of the stopper 230 is lodged in the recession 228 of the adjuster 220 and the engaging portion 234 of the stopper 230 is engaged with a selected tooth 212 of the rotator 210, the carrier 400 is locked and cannot rotate relative to the base 300. In addition, when the adjuster 220 is driven to rotate to dislodge the bump 236 of the stopper 230 from the recession 228, the rotator 210 can rotate unidirectionally or bidirectionally to adjust the inclination angle of the carrier 400. Thus, the pivot mechanism 200 is not only easy to operate, but also can effectively improve the stability of the support 100.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An angle-adjustable support comprising:

a carrier;

a base including a sidewall and a bottom, the sidewall having a first pivot and a second pivot; and;

a pivot mechanism is arranged between the carrier and the base, the pivot mechanism having three kind of working states, wherein the carrier is locked when the pivot mechanism works in a first working state, the carrier is rotatable in a clockwise or anticlockwise when the pivot mechanism works in a second working state, the carrier is free to rotate when the pivot mechanism works in a third working state; wherein the pivot mechanism further comprises:

a rotator pivotally connected to the first pivot and positioned adjacent to the sidewall, a plurality of teeth formed at a circumferential edge of the rotator;

an adjuster pivotally connected to the first pivot and being rotatable relative to the sidewall and the rotator, wherein the adjuster including a body, a protrusion and a hook, the hook extending from the body to form a recession between the body and the hook; and a stopper pivotally connected to the second pivot, wherein the stopper including an engaging portion and a bump, the bump being suitable to be locked in the recession of the adjuster, the engaging portion being suitable to selectively match with one of the teeth of the rotator.

2. The angle-adjustable support according to claim 1, further comprising an elastic element connecting the adjuster and the bottom of the base.

3. The angle-adjustable support according to claim 2, wherein the elastic element is a compression spring.

4. The angle-adjustable support according to claim 1, further comprising a torsion spring connected to the second pivot, wherein the torsion spring touched the stopper and the bottom.

5. The angle-adjustable support according to claim 1, wherein the teeth and the engaging portion are shaped like ratchets.

6. The angle-adjustable support according to claim 1, wherein the carrier is integrally formed with the rotator.

7. The angle-adjustable support according to claim 1, wherein when the pivot mechanism in the first working state, the bump is engaged in the recession and the engaging portion is engaged with one of the teeth.

8. The angle-adjustable support according to claim 1, wherein when the pivot mechanism in the second working state, the adjuster is rotated for an angle so that the bump of the stopper is moved out from the recession and the engaging portion is engaged with one of the teeth.

9. The angle-adjustable support according to claim 1, wherein when the pivot mechanism in the third working state, the adjuster is rotated for an angle so that the protrusion abuts against the bump and pushes the stopper to rotate around the second pivot and the engaging portion completely disengaged from the teeth.

10. The angle-adjustable support according to claim 1, wherein the adjuster further comprises a shifter attached to an external surface of the body of the adjuster.

* * * * *